(No Model.)

G. H. LLOYD.
SPECTACLE CASE.

No. 541,767. Patented June 25, 1895.

WITNESSES.
A. E. Humiston.
George A. Yeo.

INVENTOR.
George H. Lloyd
by F. O. Teschemacher
Atty

UNITED STATES PATENT OFFICE.

GEORGE H. LLOYD, OF SOMERVILLE, MASSACHUSETTS.

SPECTACLE-CASE.

SPECIFICATION forming part of Letters Patent No. 541,767, dated June 25, 1895.

Application filed December 5, 1894. Serial No. 530,919. (No model.)

*To all whom it may concern:*

Be it known that I, GEORGE H. LLOYD, a citizen of the United States, residing at Somerville, in the county of Middlesex and State of Massachusetts, have invented certain Improvements in Eyeglass or Spectacle Cases, of which the following is a full, clear, and exact description, reference being had to the accompanying drawings, making part of this specification, in which—

Figure 1:
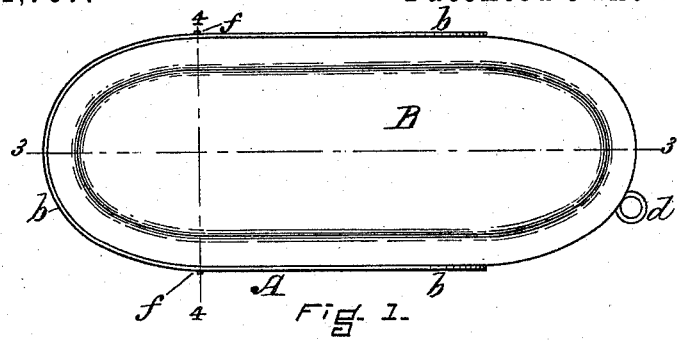
Figure 2:
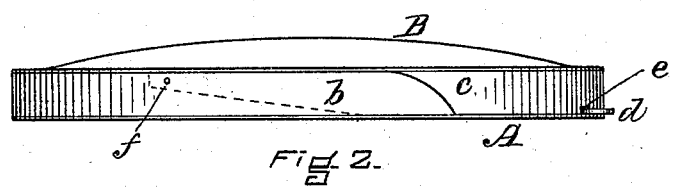
Figure 3:
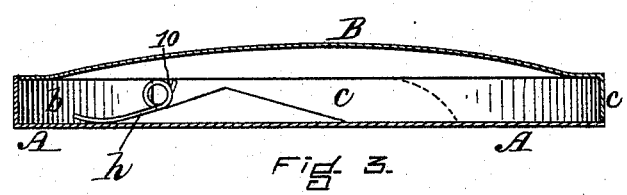
Figure 4:
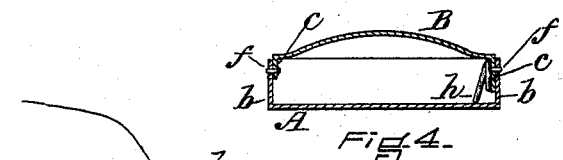
Figure 5:
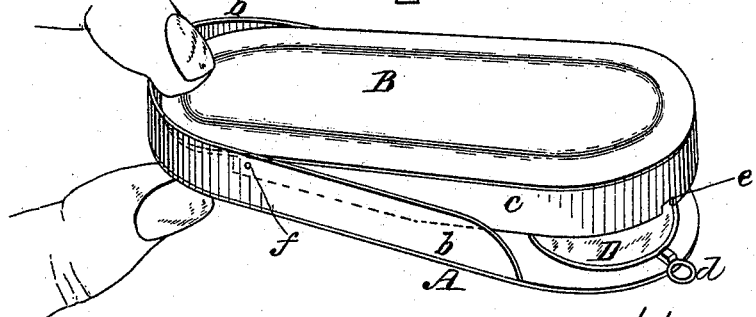

Figure 1 is a plan of an eyeglass-case constructed in accordance with my invention. Fig. 2 is a side elevation of the same. Fig. 3 is a central longitudinal section of the same on the line 3 3, of Fig. 1. Fig. 4 is a transverse vertical section on the line 4 4, of Fig. 1. Fig. 5 is a perspective view of the case showing the cover tilted up at its front end to provide an opening through which the eyeglasses may be introduced within the case or withdrawn therefrom.

My invention has for its object to provide a neat and convenient eyeglass or spectacle-case which can be easily opened by a simple pressure on one end of the cover, and which will completely inclose the glasses, thus preventing them from falling out of the case in any position in which it may be held, and at the same time effectually excluding dirt and dust.

To this end my invention consists in an eyeglass or spectacle-case composed of a body or lower portion and a tilting cover pivoted to said body in such manner that it can be tilted upward by the pressure of the finger thereupon to open the case for the insertion or withdrawal of the glasses, as hereinafter more particularly set forth.

In the said drawings, A represents the body or lower portion of the case, and B the cover, both preferably formed of thin sheet metal, and provided on the inside with a soft lining of suitable material. The portion A is provided with a flange $b$ extending partially around the same from the rear end toward the front, and the cover B is provided with a similar flange $c$ also extending partially around it from the front end toward the rear, as shown in Figs. 2, 3, and 5, the two portions A and B when fitted and pivoted together, as shown, forming a box or receptacle which will completely inclose the eyeglasses D with the exception of the handle $d$, which is preferably made to extend through a notch $e$ in the flange $c$ of the cover B. When, however, the handle $d$ is dispensed with, no portion of the eyeglasses will be exposed to view when inclosed within the case.

The flange $c$ of the cover B is provided near one end with two pivot-studs or pins $f$, $f$, arranged transversly on opposite sides of the cover and fitting within corresponding holes in the flange $b$ of the portion A, said flange yielding sufficiently to permit the studs to be sprung into place.

The cover B is provided on one side with a light wire-spring $h$ secured to the flange $c$ at 10, as shown in Fig. 3, said spring bearing upon the bottom of the portion A and thus serving to keep the cover closed, as shown in Figs. 2 and 3. By thus transversely pivoting the cover near one end it can be easily tilted up at the opposite end against the resistance of the spring $h$ by a slight pressure of the finger, as shown in Fig. 5, a large entrance opening being thus formed through which the glasses can be conveniently removed from the case or placed within the same, the cover being instantly returned to its normal closed position as soon as the pressure of the finger is removed from its rear end.

The flange $c$ of the cover B is tapered or inclined upward toward the rear so as not to interefere with eyeglass-spring, and by placing the pivots intermediate between the center and the end of the cover, a sufficiently wide opening of the case at the front end will be provided by a very slight depression of the rear end of the cover. The top of the cover B is arched longitudinally and made concavo-convex to accomodate the angular nose-piece of the eyeglasses, and enable the latter to fit nicely within the case.

A spring of any suitable construction may be employed to keep the cover closed, and said spring may be located in any convenient position to enable it to properly act upon the cover. If desired the spring may be dispensed with, in which case a suitable catch would be employed to keep the cover in place when closed.

An eyeglass-case constructed as above described possesses the advantage of being capable of being readily opened with one hand only by grasping it between the thumb and finger, as shown in Fig. 5, while at the same time the dirt and dust are excluded, and the eyeglasses prevented from falling out of the case in any position in which it may be held.

It will be obvious that the case may be made of sufficient length and of suitable shape to receive spectacles instead of eyeglasses if desired.

What I claim as my invention, and desire to secure by Letters Patent, is—

1. An eyeglass or spectacle-case, composed of a body or lower portion and a longitudinally-tilting cover transversely pivoted at a point intermediate between its ends to said body, whereby pressure on one end of the cover will raise the opposite end to open the case, substantially as described.

2. In an eyeglass or spectacle-case, the combination, with the body or lower portion, of a tilting cover transversely pivoted at a point intermediate between its ends to said body, and adapted to be raised at one end by pressure applied to its opposite end, and a spring for retaining the cover in a closed position, substantially as set forth.

3. In an eyeglass or spectacle-case, the combination, with the body or lower portion, of a longitudinally-tilting cover transversely pivoted at a point intermediate between its ends to said body, whereby it may be tilted upward at one end by pressure upon its opposite end, said body and cover being each provided with a flange extending partially around the same, and a spring for closing the cover, all operating, substantially as set forth.

Witness my hand this 3d day of December, A. D. 1894.

GEORGE H. LLOYD.

In presence of—
P. E. TESCHEMACHER,
ALICE E. HUMISTON.